United States Patent [19]
Donelly

[11] Patent Number: 5,880,738
[45] Date of Patent: Mar. 9, 1999

[54] COLOR MAPPING SYSTEM UTILIZING WEIGHTED DISTANCE ERROR MEASURE

[75] Inventor: Ross Alexander Donelly, Sunnyvale, Calif.

[73] Assignees: Canon Information Systems Research Australia Pty Ltd., Australia; Canon Kabushiki Kaisha, Japan

[21] Appl. No.: 510,466

[22] Filed: Aug. 2, 1995

[30] Foreign Application Priority Data

| Aug. 11, 1994 | [AU] | Australia | PM7411 |
| Mar. 24, 1995 | [AU] | Australia | PN1951 |
| Jul. 3, 1995 | [AU] | Australia | PN3949 |

[51] Int. Cl.$^6$ ............................................ G06T 11/00
[52] U.S. Cl. ......................................................... 345/431
[58] Field of Search ......................... 395/140, 131, 395/132, 133; 358/504, 505, 515–525; 348/576, 577, 578, 582

[56] References Cited

U.S. PATENT DOCUMENTS

| 3,893,166 | 7/1975 | Pugsley | 358/80 |
| 4,992,861 | 2/1991 | D'Errico | 358/75 |
| 5,105,469 | 4/1992 | MacDonald et al. | 358/522 |

FOREIGN PATENT DOCUMENTS 0273398  7/1988  European Pat. Off. .

OTHER PUBLICATIONS

Journal of Electronic Imaging, vol. 2, No. 1, Jan., 1993, US pp. 53–61, XP000355272 Po–Chieh Hung: "Colorimetric Calibration in Electronic Imaging Devices Using a Look–Up–Table Model and Interpolations".

*Primary Examiner*—Almis R. Jankus
*Attorney, Agent, or Firm*—Fitzpatrick, Cella, Harper & Scinto

[57] ABSTRACT

A method for computing the output values of a first series of input points, given the output values of a second series of input points is disclosed. The method comprises, for each input point of the first series forming a weighted distance measure, for each of the second series of input points, derived from the absolute distance between the first series input point and the second series input point. Next, an error measure function is determined including a summation over each of the second series of input points, of an absolute error between a proposed line or curve and the output value of the second series of points, weighted by the weighted distance measure. The error measure function is then substantially minimized to produce a finalized line or curve. The finalized line or curve is then used to derive an output value at the first series point.

27 Claims, 9 Drawing Sheets

Microfiche Appendix Included
(1 Microfiche, 43 Pages)

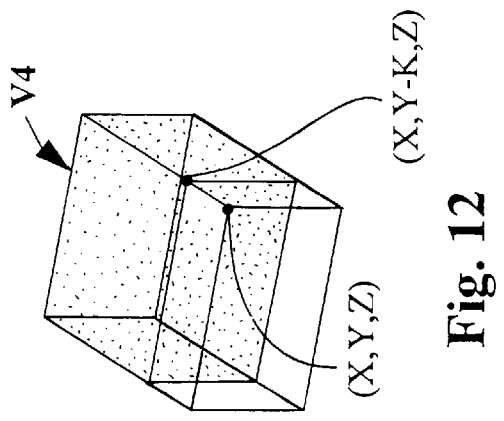
Fig. 10
Fig. 11
Fig. 12
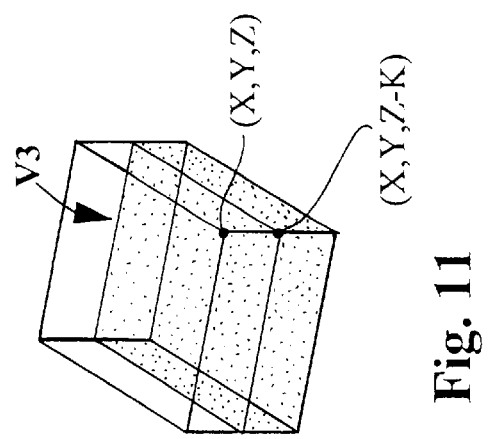
Fig. 13
Fig. 14
Fig. 15
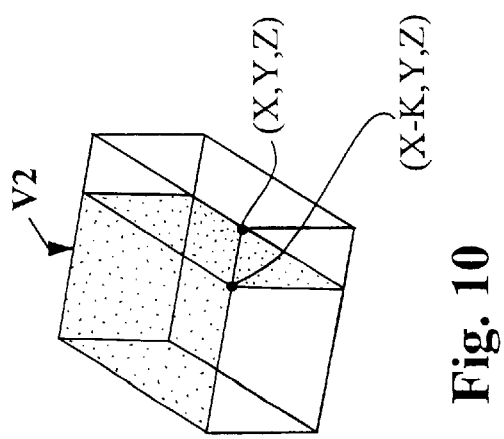

5,880,738

COLOR MAPPING SYSTEM UTILIZING WEIGHTED DISTANCE ERROR MEASURE

FIELD OF THE INVENTION

The present invention relates to the curve fitting of a series of data points and has particular applications to curved fittings so as to produce suitable color look up tables for a color space re-mapping process. Such a color re-mapping process finds particular application in the re-calibration of color printing and scanning devices.

MICROFICHE APPENDIX

A single-fiche microfiche Appendix A containing 43 pages is included with this disclosure.

BACKGROUND OF THE INVENTION

The background of the invention will now be described with reference to the accompanying drawings in which:

FIG. 1 is a schematic block diagram of a known color conversion process; and

FIG. 2 illustrates various methods utilised in deriving a predetermined set of output values.

Referring now to FIG. 1, there is shown a simplified form of a prior art color copying process. Hitherto, an image which is to be copied is placed on a scanner 1 and scanned at a high resolution, commonly 600 dots per inch (dpi). In the full color scanning process, known to those skilled in the art, the scanned values produced for each pixel of the image on scanner 1 includes separate values for the Red, Green and Blue (RGB) color components. Hence, the scanned pixels can be plotted in a three dimensional RGB color space, also known as an additive color space. The scanned pixels are normally printed out on a printer 2, which normally prints an image by utilising multiple color passes. The printer 2, normally works in a subtractive color space such as a Cyan, Magenta and Yellow (CYM) color space, or a Cyan, Yellow, Magenta and blacK (CYMK) color space. In order to transfer color values from RGB space to CYMK or CYM space, it is necessary to determine the corresponding Cyan, Yellow, Magenta and blacK components for each possible Red, Green and Blue value which a pixel of the scanned image can take. As each color component of the input signal can take a large number of values, with common systems utilising eight bit color component values, giving 256 possible levels for each color component, the number of overall combinations of values for input pixels is extremely large (in this example over 16 million values).

In order to determine the mapping for any particular RGB—CYMK transfer function, a series of known RGB values can be printed out by the output device or printer 2 and their colormetric CYMK values can be measured using a colorimeter.

As the number of possible color points is excessively large, one method of determining a transfer function is to measure the color component values of a predetermined number of points and to derive a table with each entry being a 7 tuple (RGBCYMK) comprising the RGB values and corresponding CYMK values obtained from measurements. Points not in the table can then be derived by means of interpolation. The normal interpolation technique used is linear interpolation and an example of such a system is given in U.S. Pat. No. 3,893,166 by Pugsley, entitled "Color Correcting Image Reproduction Methods and Apparatus".

The predetermined points can be chosen utilising a number of criteria. Firstly, it is desirable that the points cover the whole of the color space. Secondly, the system utilised for interpolation can require the predetermined points to be, for example, evenly spaced within one or other of the color spaces. Alternatively, it can be desirable to increase the number of points where the color transfer function is not well behaved, at the expense of decreasing the number of points where the transfer function is well behaved, thereby giving an overall increase in accuracy for the interpolation process.

Unfortunately, the physical color conversion process is known to be a highly non-linear process with the actual color produced by printer 2 being dependent on a large number of factors including the type of inks used, the type of paper used and the type of scanners used to scan the image from scanner 1. Consequentially, given an initial set of sample points, it is unclear how to derive a set of desired predetermined points from the set of sample points.

Referring now to FIG. 2, there will now be explained an example of two prior art color conversion processes. As stated previously, the color conversion process is a highly non-linear one and includes interactions between the various color components. Although the process is a multi-dimensional one, FIG. 2 shows a single slice through the multi-dimensional plane for constant green and blue for illustration of a particular transfer function between the Red component of an input image and the required Magenta output component.

It is assumed that, for a series of sample points, 30–38, the corresponding Red components 20–28 and corresponding Magenta components 40–48 are measured. This set of sample points can then be plotted on the Red-Magenta axes, and from this series of plots an overall curve or transfer function derived.

Unfortunately, once the sample points have been plotted, it is unclear as to what process should then be utilised to derive the corresponding magenta values of a set of predetermined points 12–19 on the red axis. A number of known methods can be used, however, each of these methods have a number of significant disadvantages. In a first method known as Lagrange interpolation, a polynomial 9 is fitted to the sample data such that it passes through each of the sample data points. Use of Lagrange interpolation often produces inadequate results for those sample points which are not well behaved (i.e. do not substantially conform to a linear relationship) and the Lagrange interpolation can result in a transfer function having excessive oscillation thereby producing unrealistic results.

A second known method is that known as "least squares" which, in its simplest form, fits a straight line, 10, in the vicinity of the given data points such that the sum of the squares of the distances of those points from the straight line is minimised, where the distance is measured in the vertical direction. Unfortunately, the least squares method can itself lead to a substantial reduction in the fidelity of the transfer function as -much detail is lost. The fitting of quadratics and higher order polynomials utilising a least squared methodology is also known to those skilled in the art but goes only part of the way to solving this problem of fidelity loss.

A third method of deriving the transfer function can consist of constructing straight line segments between the various data points. However, this method can lead to large discontinuities of derivatives at the various end points. In the color conversion process, such a transfer function has been found to produce unacceptable results with banding and other artifacts being found in certain images.

SUMMARY OF THE INVENTION

It is an object of the present invention to provide an improved method for determining the output values of a first series of input points, given the output values of a second series of input points. By use of such a method, the necessary transfer function can be derived.

In accordance with one aspect of the present invention, there is provided a method for computing the output values of a first series of input points, given the output values of a second series of input points, said method comprising, for each of said first series of input points:

forming a weighted distance measure, for each of said second series of input points, derived from the absolute distance between said first series input point and said second series input point;

determining an error measure function including a summation over each of said second series of input points, of an absolute error between a proposed line or curve and the output value of said second series of points, weighted by said weighted distance measure;

substantially minimizing said error function to produce a finalized line or curve; and, utilizing said finalized line or curve to derive an output value at said first series point.

Preferably, said step of determining said error measure function comprises determining said summation from a previously calculated summation forming part of said error measure functions for adjacent input points of a current one of said first series of input points and from said second series of input points which are between said adjacent input points and said current one of said first series of input points.

Preferably, said step of determining said error measure function further comprises multiplying said previously calculated summation by a constant.

BRIEF DESCRIPTION OF THE DRAWINGS

A number of preferred embodiments of the present invention will now be described with reference to the accompanying drawings in which:

FIG. 8 to FIG. 15 illustrate the process of determining a summation from many different part summations.

DETAILED DESCRIPTION OF THE PREFERRED EMBODIMENTS

Turning now to a first embodiment of the present invention, the transfer function is determined by utilising a "weighted least squares" process, the details of which will be further described herein, firstly in relation to the a one dimensional transfer process and subsequently in relation to a multi-dimensional transfer process.

Figure 1:
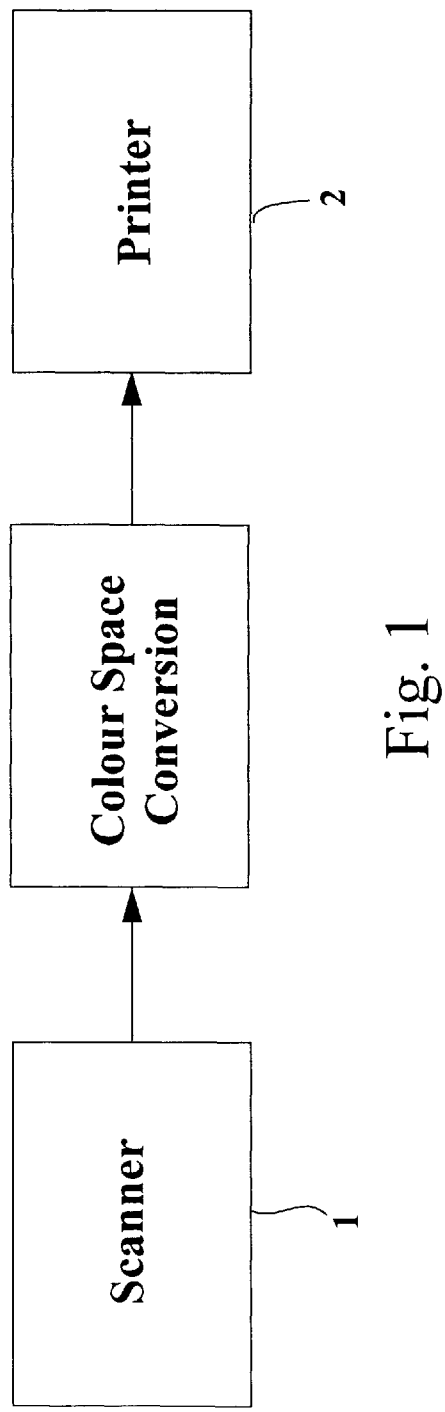
FIG. 1 is a schematic block diagram of a known color conversion process.
Figure 2:
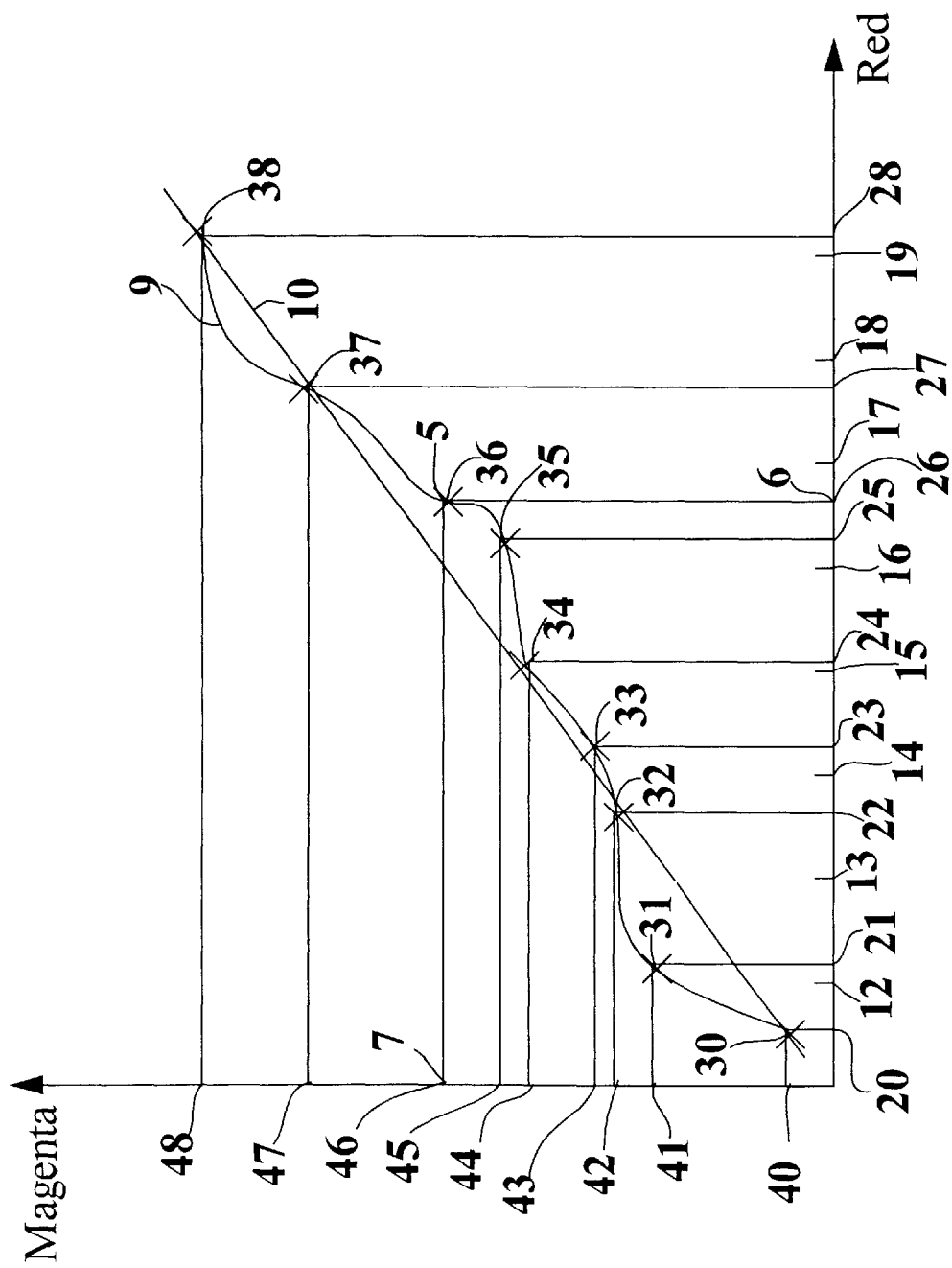
FIG. 2 illustrates various methods utilized in deriving a predetermined set of output values.

In a two dimensional case it is desired to determine a corresponding function value at a predetermined series of points 12–19 of FIG. 2, given the sample input values 20–28 and corresponding output values 40–48. The method for determining output values for each of the set of points 12–19 utilises a weighting ($w_i$) which is assigned to each sample point 20-28 depending on how close it is to a desired value e.g. 12. Although many different weighting functions can be used, it has been found that an inverse exponential weighting function produces a suitable result. In particular, a weighting function of the following form is preferred:

$$w = e^{-d/\sigma} \quad \text{(EQ1)}$$

In this equation, d represents an absolute distance measure between the sample point, and the desired output point and a is a scaling or noise following factor. Larger values of $\sigma$ result in the closer points having substantially more influence on the resultant output value. In the preferred embodiment the value used for $\sigma$ is 0.06 when the color values take on the range 0 to 1.

Once a weighting value has been assigned to each value point, a weighted error squared function can be formed as follows:

$$E = \sum_i w_i(ax_i + b - v_i)^2 \quad \text{(EQ2)}$$

where v=ax+b is the equation of a line to approximate the data points in the vicinity of the desired point. In the present example x signifies the Red axis and v signifies the Magenta axis. To minimise the weighted error squared function E, the partial derivatives of E are taken and set to zero as follows:

$$\frac{\partial E}{\partial a} = \sum_i 2w_i x_i(ax_i + b - v_i) = 0 \quad \text{(EQ3)}$$

$$\text{i.e. } \sum_i w_i x_i v_i = a\left(\sum_i w_i x_i^2\right) + b\left(\sum_i w_i y_i x_i\right) \quad \text{(EQ4)}$$

$$\frac{\partial E}{\partial b} = \sum_i 2w_i(ax_i + b - v_i) = 0 \quad \text{(EQ5)}$$

$$\text{i.e. } \sum_i w_i v_i = a\left(\sum_i w_i x_i\right) + b\left(\sum_i w_i\right) \quad \text{(EQ6)}$$

This gives two linear equations (4), (6) with two unknowns (a, b). Hence, this system of equations can be solved for a and b and the final equation of the line v=ax+b can be used to determine an output value for the point v at the desired input point x.

The above process can then be repeated for each of the desired predetermined points 12–19 to produce an overall series of corresponding output values.

The above process can be readily extended to many dimensions. For example, to calculate a mapping from three input dimensions (x,y,z) to one output dimension (v), given a predetermined set of sample points ($x_i$, $y_i$, $z_i$, $v_i$), each desired output point is calculated in the following manner:

Firstly, a weighting ($w_i$) is assigned to each sample point depending on how close it is to the desired output point, with the distance being calculated using a Euclidean distance measure. Next, a weighted error squared function is formed as follows:

$$E = \sum_i w_i(a + by_i + cz_i + d - v_i)^2 \quad \text{(EQ7)}$$

where V=ax+by+cz+d is the equation of a hyperplane which approximates the data points in the four dimensional space. To minimise E, the partial derivatives are again set to zero:

$$\frac{\partial E}{\partial a} = \sum_i 2w_i x_i(ax_i + by_i + cz_i + d - v_i) = 0 \qquad \text{(EQ8)}$$

this gives:

$$\left(\sum_i w_i x_i v_i\right) = \qquad \text{(EQ9)}$$

$$a\left(\sum_i w_i x_i^2\right) + b\left(\sum_i w_i y_i x_i\right) + c\left(\sum_i w_i z_i x_i\right) + d\left(\sum_i w_i x_i\right)$$

Similarly, from $\frac{\partial E}{\partial b} = 0$ we have:

$$\left(\sum_i w_i y_i v_i\right) = \qquad \text{(EQ10)}$$

$$a\left(\sum_i w_i x_i y_i\right) + b\left(\sum_i w_i y_i^2\right) + c\left(\sum_i w_i z_i y_i\right) + d\left(\sum_i w_i y_i\right)$$

Similarly, from $\frac{\partial E}{\partial c} = 0$ we have:

$$\left(\sum_i w_i z_i v_i\right) = \qquad \text{(EQ11)}$$

$$a\left(\sum_i w_i x_i z_i\right) + b\left(\sum_i w_i y_i z_i\right) + c\left(\sum_i w_i z_i^2\right) + d\left(\sum_i w_i z_i\right)$$

Similarly, from $\frac{\partial E}{\partial d} = 0$ we have:

$$\left(\sum_i w_i v_i\right) = a\left(\sum_i w_i x_i\right) + b\left(\sum_i w_i y_i\right) + c\left(\sum_i w_i z_i\right) + d\left(\sum_i w_i\right) \qquad \text{(EQ12)}$$

This then gives four linear equations and four unknowns (a, b, c, d). It is therefore possible to solve for (a, b, c, d) and substitute the desired input value into the derived hyperplane to obtain an output value for v at the point (x, y, z). This process can then be repeated for each desired output point.

The obtained points can then be loaded into a color correction system such as that disclosed in U.S. Pat. No. 3,893,166 and utilised in an interpolation system for deriving color space transformation values.

Other weighting functions, such as a Gaussian or a linear distance measure can be used, however, the stated weighting function has been found to produce the best results to date. An example weighting function which is somewhat quicker to evaluate on modern computers and which also gives suitable results and which can be used in substitution for Equation 1 is:

$$e^{-(|dx|+|dy|+|dz|)/\sigma} \qquad \text{(EQ13)}$$

where dx, dy and dz are distances measured from the sample point in question to the desired output point in x, y and z co-ordinates respectively.

Modern color laser copiers are often subject to substantial color variation over their operational life. It is therefore often the case that they require constant recalibration. Unfortunately, the above mentioned process is too computationally intensive for use in anything but a batch process. As it is desirable to be able to quickly recalibrate an output device, a less computationally demanding color mapping process is desired.

One such form of efficient calibration will now be described. However, for simplification of the method to be described, a reformulation of the problem and solution is required.

Firstly, the one dimensional case of the problem can be described as the calculation of a mapping of a one-dimensional array of equally-spaced point-values from a randomly distributed set of point-values utilising the previously described "exponential" least squares fit to calculate each equally spaced point-value.

Figure 3:
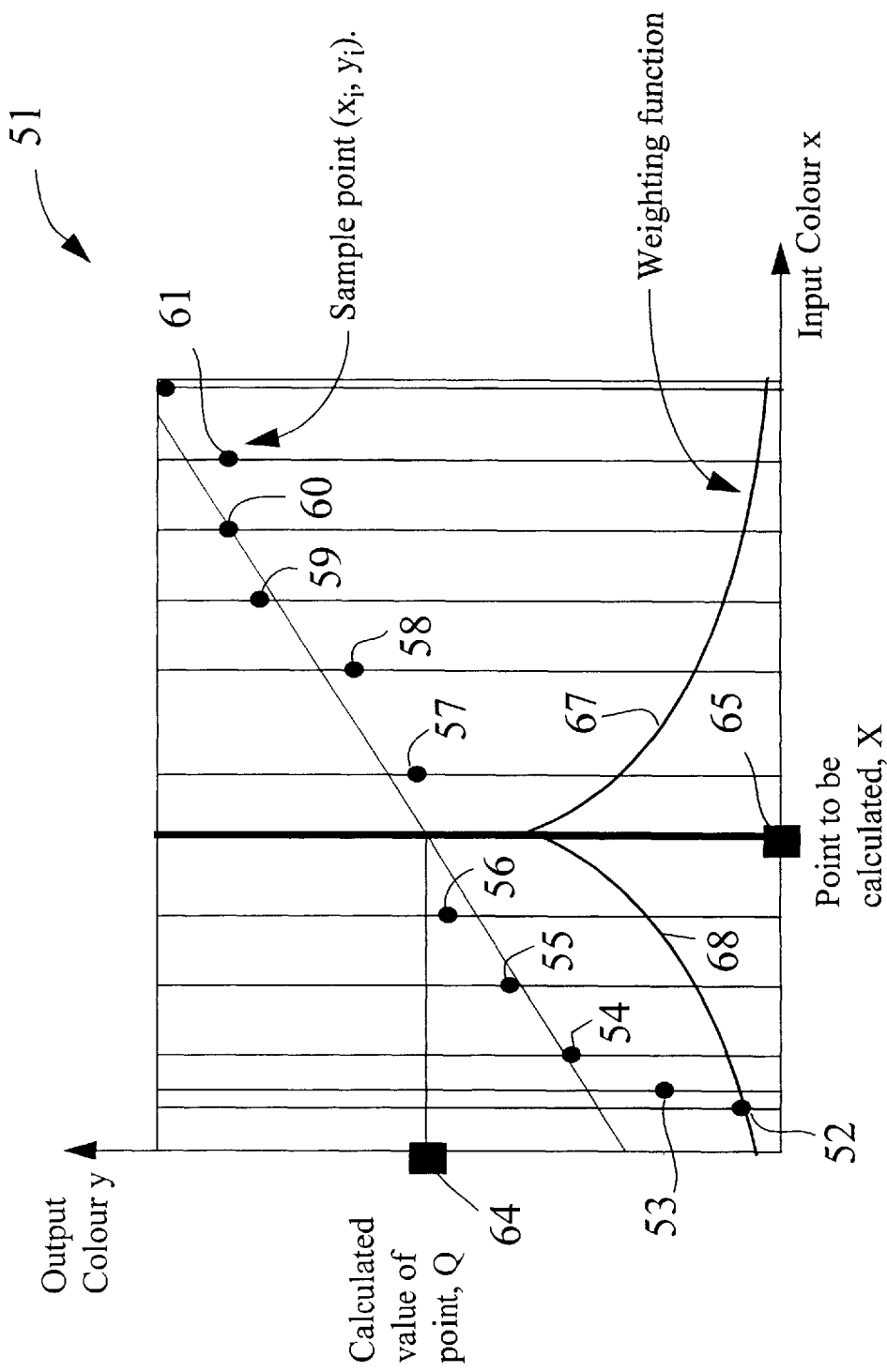
FIG. 3 illustrates a second example of an input—output mapping utilising a single weighting function.

Referring now to FIG. 3, there is shown a second example of an input—output mapping utilising a single weighting function. The weighting function 51 is illustrated in the one dimensional case. It is assumed that eleven sample points 52–61 are provided and it is desired to calculate the output value Q 64 at the desired point X, 62 in accordance with the previously described weighted exponential method with reference to Equation 1.

In this method, the "exponential" least squares fit involves a weighted summation of quantities from the sample input values. For example, an example of the resultant summation can be characterised as:

$$\text{sum}_i(w(x_i) * x_i) \text{ or sum}_i(w(y_i) * y_i) \qquad \text{(EQ14)}$$

where $(x_i, y_i)$ is the position of sample point i, sumi is the sum over all the sample values and w(x) is the desired weighting function.

The sample points closer to the desired point 65 are more important, so they have a greater weight attached to them when summing.

The desired form of the weighting function for the particular desired output X value is made up of two exponential curves 67, 68 which take the following form:

$$w_X(a) = e^{-(a-X)/\sigma} \text{ if } a > X \qquad \text{(EQ15)}$$

$$wX(a) = e^{-(X-a)/\sigma} \text{ if } a <= X. \qquad \text{(EQ16)}$$

Figure 4:
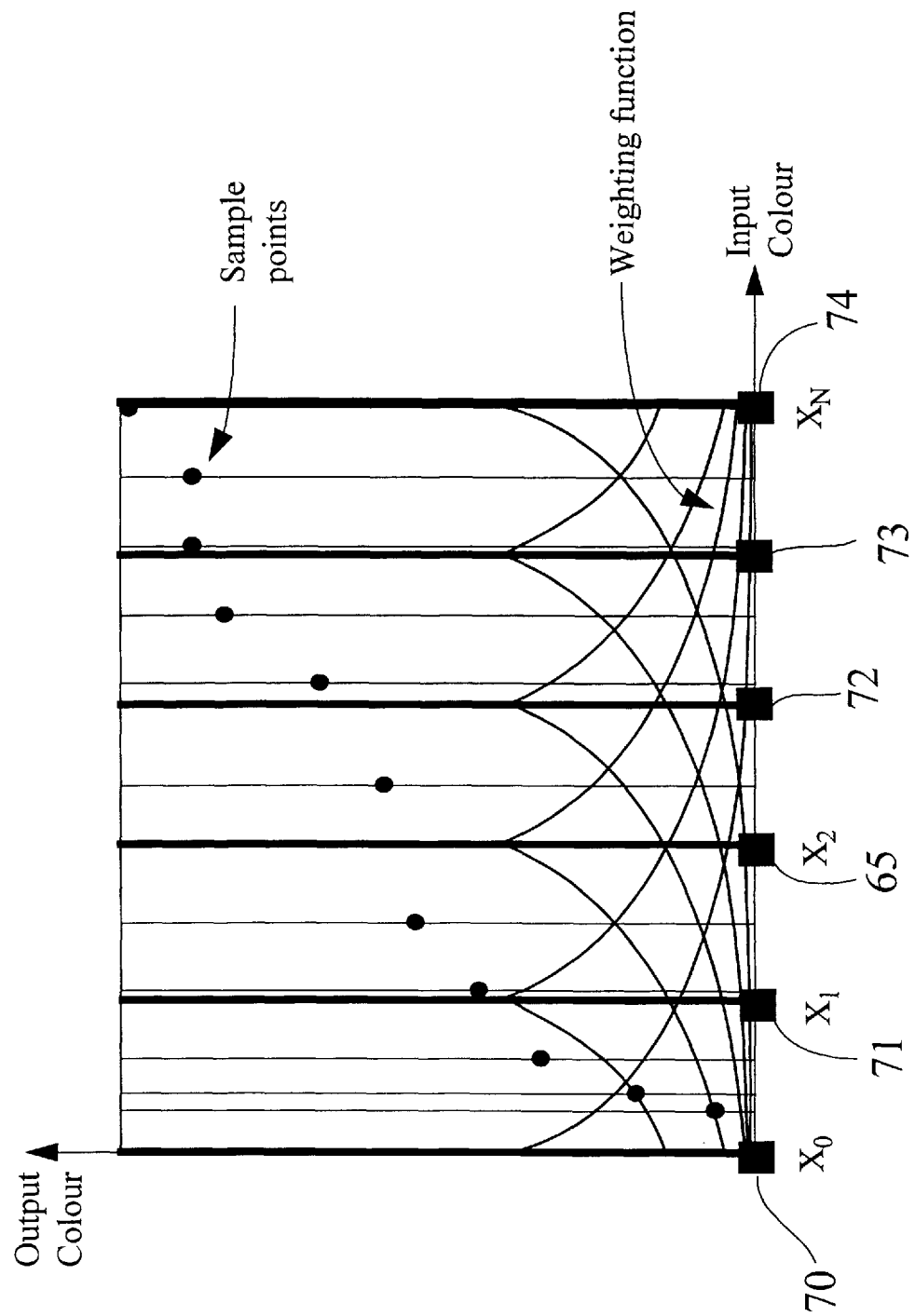
FIG. 4 illustrates the weighting function of FIG. 3 when applied to a series of equally spaced input points.

Referring now to FIG. 4, there is shown the weighting function of FIG. 3 when applied to a series of equally spaced input points. To create the mapping, it is assumed that the output values of a series of equally spaced points 65, 70–74, must be calculated. These points can be denoted $\{X_0 . . X_N\}$, where $X_j = K \times j$, K being a constant.

If each point is calculated in turn from left to right, the weighting function can be said to "move" from left to right. This is illustrated in FIG. 4 where the weighting function takes the same form around each of the desired input points $X_1$ to $X_N$.

It should be noted that it is a property of an exponential curve that moving the curve by a constant amount is equivalent to multiplying its value by another constant. Mathematically, this can be represented by the expression:

$$e^{x-C} = e^{-C} \cdot e^x \qquad \text{(EQ. 17)}$$

From FIG. 3, the weighting function 67, 68 is made up of two separate exponential curves, the left curve and the right curve. If the overall sum required to be calculated is expressed as follows:

$$S(X) = \text{sumi}(w_x(x_i) * v_i) \qquad \text{(EQ18)}$$

then it is possible to split the contribution from the weighted sample values into a "left hand side" portion and a "right hand side" portion as follows:

$$S_{left}(X) = \text{sum}_{i:xi<x}(w_x(x_i) * v_i) \qquad \text{(EQ19)}$$

$$S_{right}(X) = \text{sum}_{i:xi>=x}(w_X(x_i) * v_i) \text{tm (EQ20)}$$

with:

$$S(X) = S_{left}(X) + S_{right}(X) \qquad \text{(EQ21)}$$

Now the sums $S_{left}$ and $S_{right}$ can be calculated independently. By way of example, the sum $S_{left}$ can be calculated for the left hand side points in accordance with the following pseudo-code:

$S_{left}(X_0)=S_{left}(0)=0$ by definition.

For $j = 1$ to $N$ calculate $S_{left}(X_j)$ using $S_{left}(X_{j-1})$ as follows:

$$S_{left}(X_j) = \text{sum}_{i:xi<X_j}(w_{X_j}(x_i) * v_i)$$

$$= \text{sum}_{i:xi<X_{j-1}}(w_{X_j}(x_i) * v_i) +$$
$$\text{sum}_{i:X_{j-1}<=xi<X_j}(w_{X_j}(x_i) * v_i)$$

$$= \text{sum}_{i:xi<X_{j-1}}(e^{-(X_j-xi)/\sigma} * v_i) +$$
$$\text{sum}_{i:X_{j-1}<=xi<X_j}(w_{X_j}(x_i) * v_i)$$

$$= \text{sum}_{i:xi<X_{j-1}}(e^{-(X_{j-1}+K-xi)/\sigma} * v_i) +$$
$$\text{sum}_{i:X_{j-1}<=xi<X_j}(w_{X_j}(x_i) * v_i)$$

$$= \text{sum}_{i:xi<X_{j-1}}(e^{-K/X\sigma} \cdot e^{-(X_{j-1}-xi)/\sigma} * v_i) +$$
$$\text{sum}_{i:X_{j-1}<=xi<X_j}(w_{X_j}(x_i) * v_i)$$

$$= e^{-K/\sigma} \cdot \text{sum}_{i:xi<X_{j-1}}(e - (^{X_{j-1}-xi)/\sigma} * v_i) +$$
$$\text{sum}_{i:X_{j-1}<=xi<X_j}(w_{X_j}(x_i) * v_i)$$

$$= e^{-K/\sigma} \cdot \text{sum}_{i:xi<X_{j-1}}(w_{X_{j-1}}(x_i) * v_i) +$$
$$\text{sum}_{i:X_{j-1}<=xi<X_j}(w_{X_j}(x_i) * v_i)$$

$$= e^{-K/\sigma} \cdot S_{left}(X_{j-1}) + \text{sum}_{i:X_{j-1}<=xi<X_j}(w_{X_j}(x_i) * v_i)$$

Hence, all of the $S_{left}$ sums can be calculated in one pass through the sample data as the final form of $S_{left}(X_j)$ is in the form of a recurrence relation involving the previous sum $S_{left}(X_j)$ and those values between a previous input point and a current input point. The process of calculating $S_{right}$ can be determined in a similar manner, moving right-to-left instead of left-to-right.

Figure 5:
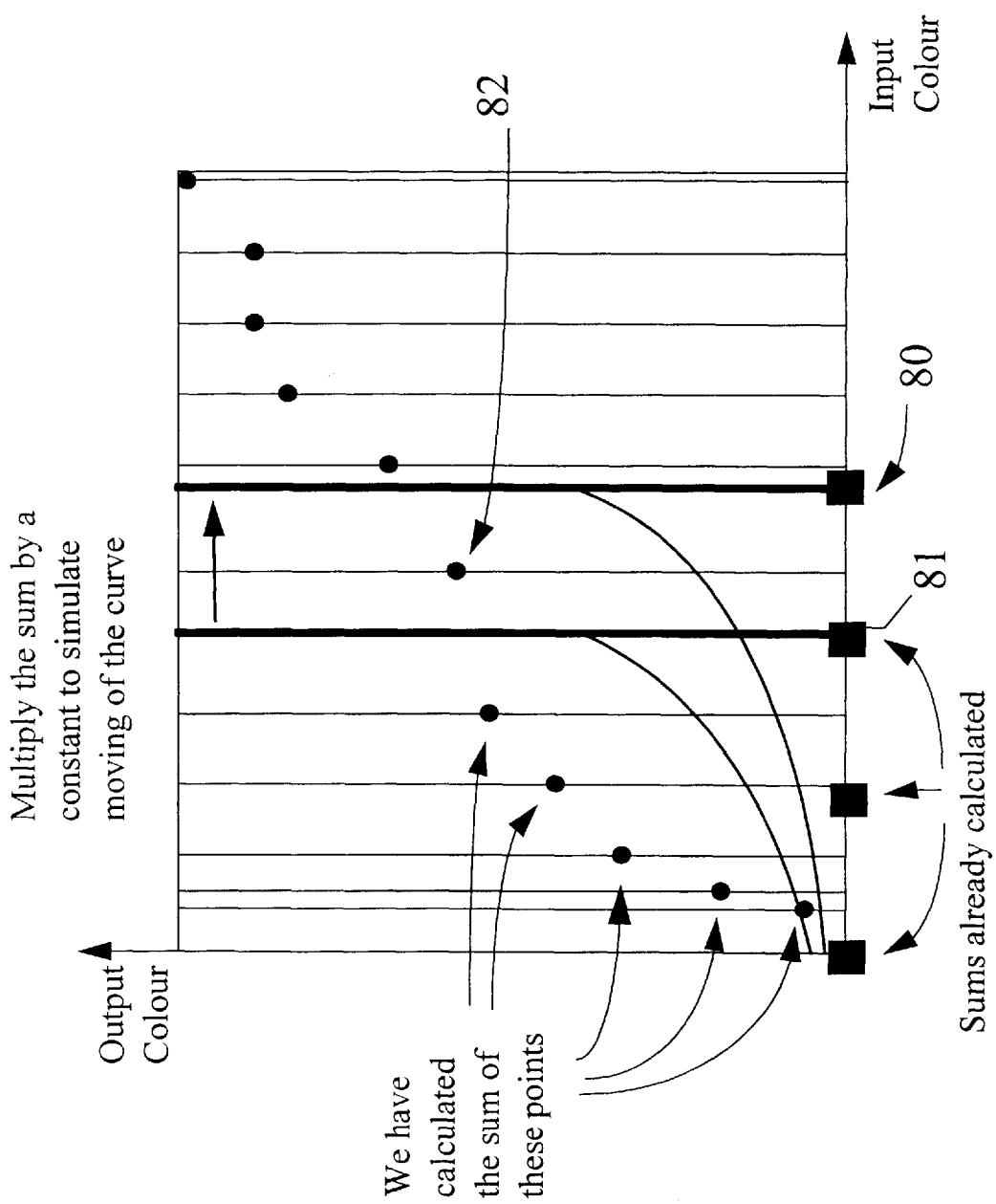
FIG. 5 illustrates the process of calculating a new output point in accordance with the recurrence relationship utilised as part of a second embodiment.

Referring now to FIG. 5, there is shown the process of calculating a new output point in accordance with the recurrence relationship utilised as part of a second embodiment. At the stage of the process illustrated, it is desired to calculate the output value for the new point 80. The value of the previous sum, calculated for the point 81 is known. Therefore, in order to move from the point 81 to the point 80, the previous sum for the point 81 is multiplied by the constant $e^{-K/\sigma}$ and added to the weighted value of any sample point e.g. 82, which is between the points 80 and 81, to produce the new sum.

Once $S_{left}$ and $S_{right}$ are calculated for all points, they can then be added together to produce values of S at all points. The least-squares fit can then be performed.

Since it is desired to utilise the above process for color conversion of colors stored as three dimensional values, the process needs to be extended into three dimensions. As noted previously, a number of different alternative weighting functions can be utilised. However, to extend the above one dimensional process into three dimensions, the following weighting function was chosen:

$$w_{X,Y,Z}(x, y, z) = e^{-(abs(x-X)+abs(y-Y)+abs(z-Z))/\sigma} \quad (EQ22)$$

This weighting function is analogous to the well known "Manhattan" distance measure of treating each dimension independently, being in an equivalent form to Equation 13.

Figure 6:
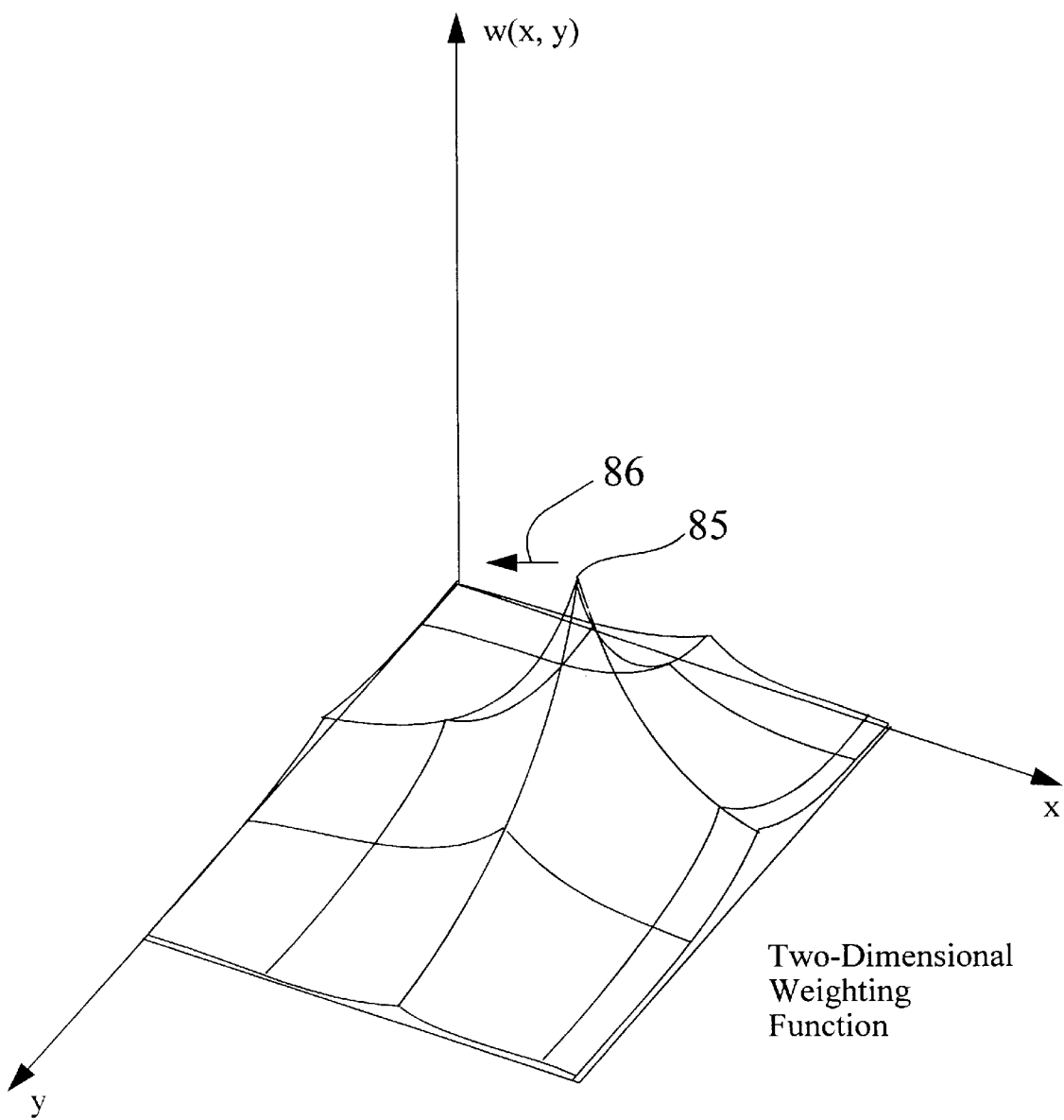
FIG. 6 illustrates the weighting function of FIG. 3 in two dimensions.

Referring now to FIG. 6, there is shown the weighting function of FIG. 3 in two dimensions. Of course, the weighting function is inherently a three dimensional process (w(x,y,z)), however, due to the difficulties of illustrating a three dimensional process, only two dimensions (w(x,y)) are illustrated in FIG. 6. In FIG. 6, any movement of the weighting function in the direction of constant y (in the direction of arrow 86), can be simulated by the multiplication of the relevant sums by a constant.

More formally, the process of calculation can be set out in a similar way to the one-dimensional case as follows:

$$S(X,Y,Z) = \text{sum}_i(w_{x,y,z}(x_i,y_i,z_i)*v_i) \quad (EQ23)$$

Then the weighting function can be split into a "left hand side" and a "right hand side":

$$S_{left}(X,Y,Z) = \text{sum}_{i:xi<x}(W_{x,y,z}(x_i,y_i,z_i)*v_i) \quad (EQ24)$$

$$S_{right}(X,Y,Z) = \text{Sum}_{i:xi>=x}(w_{X,Y,Z}(x_i,y_i,z_i)*v_i) \quad (EQ25)$$

Therefore:

$$S(X,Y,Z) = S_{left}(X,Y,Z) + S_{right}(X,Y,Z) \quad (EQ26)$$

The sums $S_{left}$ and $S_{right}$ can then be calculated independently. For example, the sum $S_{left}$ is calculated at all points as follows:

For l=0 to N
  For m=0 to N
    Y=K×l
    Z=K x m
    $S_{left}(X_0,Y,Z)=S_{left}(O,Y,Z)=0$ by definition.

For $j = 1$ to $N$ calculate $S_{left}(X_j, Y, Z)$ using $S_{left}(X_{j-1}, Y, Z)$ as follows:

$$S_{left}(X_j, Y, Z) = \text{sum}_{i:xi<X_j}(w_{X_j,Y,Z}(x_i, y_i, z_i) * v_i)$$

$$= \text{sum}_{i:xi<X_{j-1}}(w_{X_j,Y,Z}(x_i, y_i, z_i) * v_i) + \text{sum}_{i:X_{j-1}<=xi<X_j}(w_{X_j,Y,Z}(x_i, y_i, z_i) * v_i)$$

$$= \text{sum}_{i:xi<X_{j-1}}(e^{-(abs(X_j-xi)+abs(Y-yi)+abs(Z-zi))/\sigma} * v_i) + \text{sum}_{i:X_{j-1}<=xi<X_j}(w_{X_j,Y,Z}(x_i, y_i, z_i) * v_i)$$

$$= \text{sum}_{i:xi<X_{j-1}}(e^{-(X_j-xi+abs(Y-yi)+abs(Z-zi))/\sigma} * v_i) + \text{sum}_{i:X_{j-1}<=xi<X_j}(w_{X_j,Y,Z}(x_i, y_i, z_i) * v_i)$$

$$= \text{sum}_{i:xi<X_{j-1}}(e^{-(X_{j-1}+K-xi+abs(Y-yi)+abs(Z-zi))/\sigma} * v_i) + \text{sum}_{i:X_{j-1}<=xi<X_j}(w_{X_j,Y,Z}(x_i, y_i, z_i) * v_i)$$

$$= \text{sum}_{i:xi<X_{j-1}}(e^{-K/\sigma} \cdot e^{-(X_{j-1}-xi+abs(Y-yi)+abs(Z-zi))/\sigma} * v_i) + \text{sum}_{i:X_{j-1}<=xi<X_j}(w_{X_j,Y,Z}(x_i, y_i, z_i) * v_i)$$

$$= e^{-K/\sigma} \cdot \text{sum}_{i:xi<X_{j-1}}(e^{-(X_{j-1}-xi+abs(Y-yi)+abs(Z-zi))/\sigma} * v_i) + \text{sum}_{i:X_{j-1}<=xi<X_j}(w_{X_j,Y,Z}(x_i, y_i, z_i) * v_i)$$

$$= e^{-K/\sigma} \cdot \text{sum}_{i:xi<X_{j-1}}(e^{-(abs(X_{j-1}-xi)+abs(Y-yi)+abs(Z-zi))/\sigma} * v_i) + \text{sum}_{i:X_{j-1}<=xi<X_j}(w_{X_j,Y,Z}(x_i, y_i, z_i) * v_i)$$

$$= e^{-K/\sigma} \cdot \text{sum}_{i:xi<X_{j-1}}(w_{X_{j-1},Y,Z}(x_i, y_i, z_i) * v_i) + \text{sum}_{i:X_{j-1}<=xi<X_j}(w_{X_j,Y,Z}(x_i, y_i, z_i) * v_i)$$

$$= e^{-K/\sigma} \cdot S_{left}(X_{j-1}, Y, Z) + \text{sum}_{i:X_{j-1}<=xiX_j}(w_{X_j,Y,Z}(x_i, y_i, z_i) * v_i)$$

The final result is in the same form as the one dimensional case.

It will be evident to those skilled in the art that whereas the normal method of calculating an exponentially weighted least squares fit over the input sample data would require in the order of $O(N^3)$ passes through three dimensional data, the above incremental calculation process reduces the number of passes to be of $O(N^2)$ passes.

The above three dimensional incremental process can be further improved on from an order $O(N^2)$ process to a process requiring order $O(1)$ passes through a set of three dimensional input data at the expense of requiring $O(N^3)$ storage locations, which is practical for most applications.

Firstly, instead of $S_{left}$ and $S_{right}$, a partial sum for each of the eight 'octants' around a point in 3D space is determined as follows:

$$S_{<<<}(X,Y,Z) = \text{sum}_{i:xi<X, yi<Y, zi<Z}(W_{X,Y,Z}(x_i,y_i,z_i)*v_i) \quad (EQ27)$$

$$S_{<<>}(X,Y,Z) = \text{sum}_{i:xi<X, yi<Y, zi>=Z}(W_{X,Y,Z}(x_i,y_i,z_i)*v_i) \quad (EQ28)$$

$$S_{<><}(X,Y,Z) = \text{sum}_{i:xi<X, yi>=Y, zi<Z}(W_{X,Y,Z}(x_i,y_i,z_i)*v_i) \quad (EQ29)$$

$$S_{<>>}(X,Y,Z) = \text{sum}_{i:xi<X, yi>=Y, zi>=Z}(W_{X,Y,Z}(x_i,y_i,z_i)*v_i) \quad (EQ30)$$

$$S_{><<}(X,Y,Z) = \text{sum}_{i:xi>=X, yi<Y, zi<Z}(W_{X,Y,Z}(x_i,y_i,z_i)*v_i) \quad (EQ31)$$

$$S_{><>}(X,Y,Z) = \text{sum}_{i:xi>=X, yi<Y, zi>=Z}(W_{X,Y,Z}(x_i,y_i,z_i)*v_i) \quad (EQ32)$$

$$S_{>><}(X,Y,Z) = \text{sum}_{i:xi>=X, yi>=Y, zi<Z}(W_{X,Y,Z}(x_i,y_i,z_i)*v_i) \quad (EQ33)$$

$$S_{>>>}(X,Y,Z) = \text{sum}_{i:xi>=X, yi>=Y, zi>=Z}(W_{X,Y,Z}(x_i,y_i,z_i)*v_i) \quad (EQ34)$$

Trivially then, $S(X,Y,Z)$ will be just the sum of each of the octants:

$$S(X,Y,Z) = S_{<<<}(X,Y,Z) + S_{<<>}(X,Y,Z) + S_{<><}(X,Y,Z) + S_{<>>}(X,Y,Z) + S_{><<}(X,Y,Z) + S_{><>}(X,Y,Z) + S_{>><}(X,Y,Z) + S_{>>>}(X,Y,Z) \quad (EQ35)$$

Figure 7:
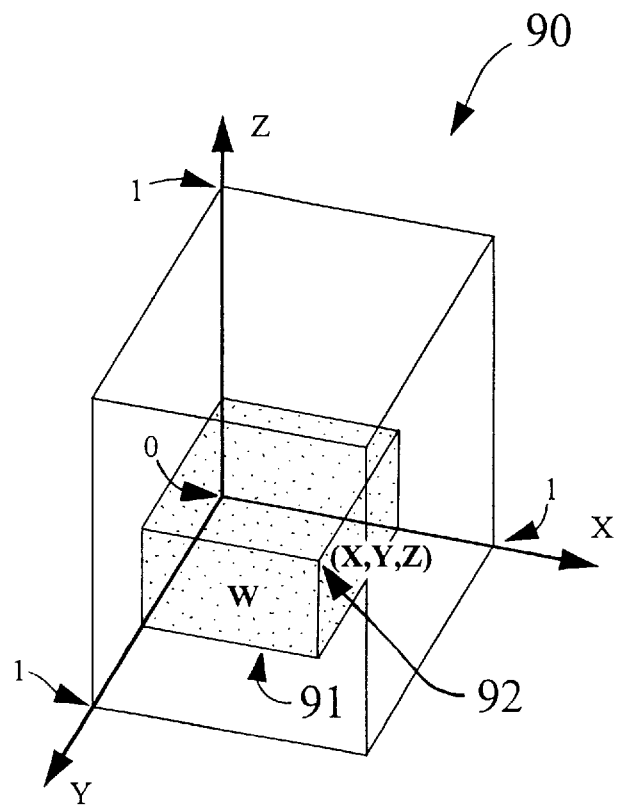
FIG. 7 illustrates the process of forming a summation from lower, previously calculated summations.
Figure 8:
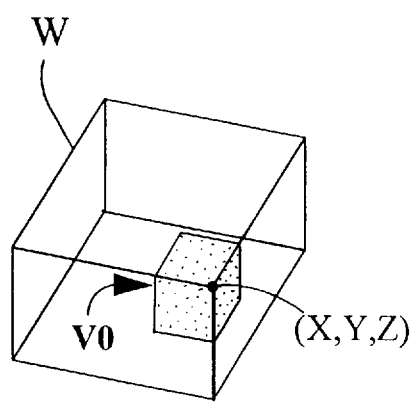
Figure 9:
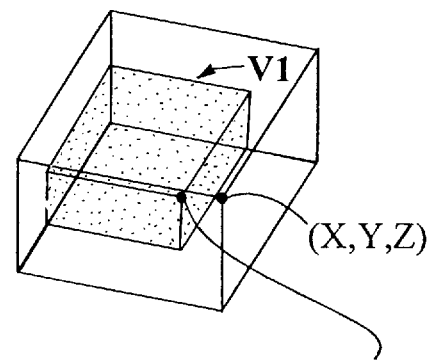
Figure 16:
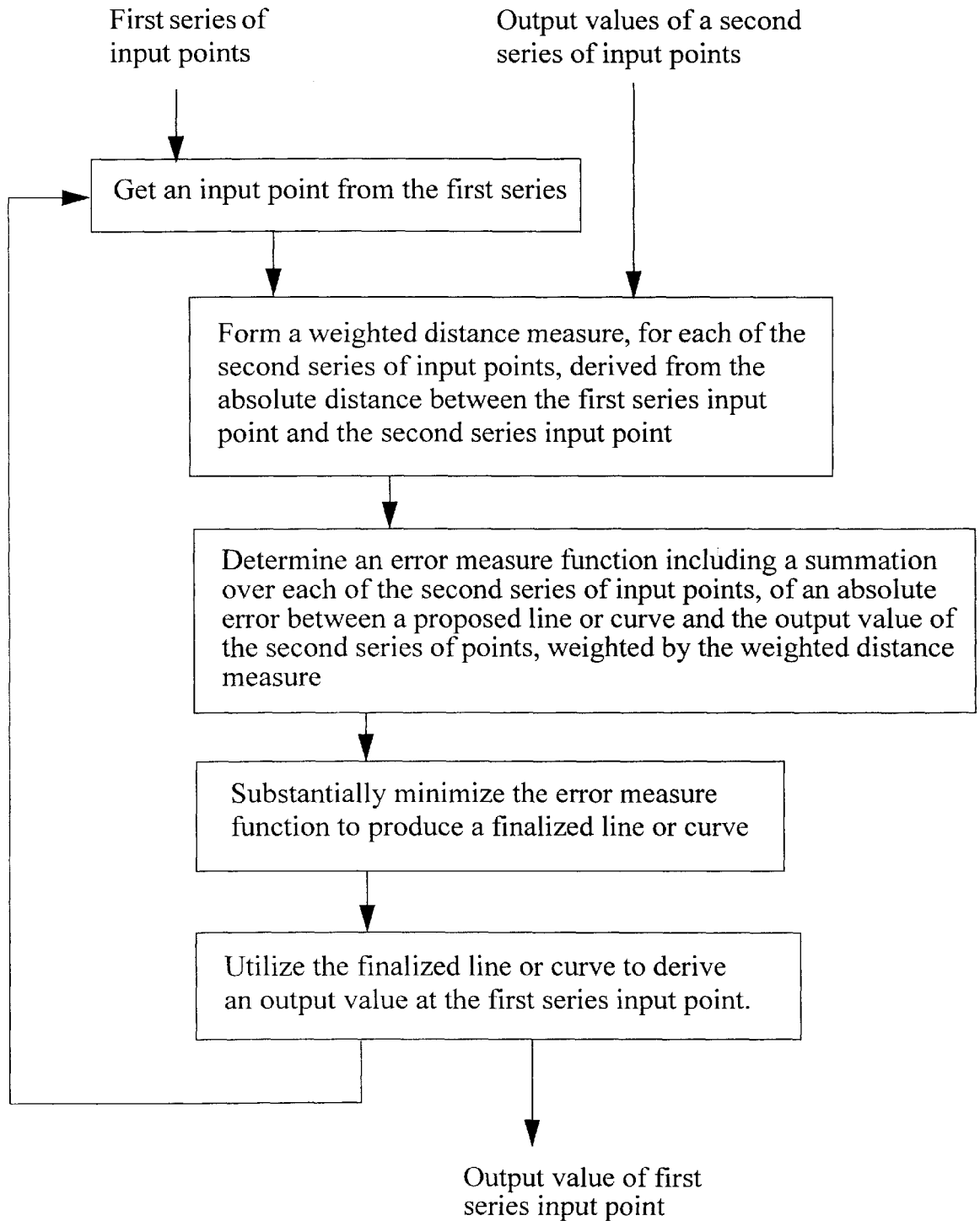
FIG. 16 is a flowchart indicative of a fundamental embodiment of the described invention.

Firstly, consider the calculation of $S_{<<<}$ for all grid points. Turning now to FIG. 7, there is shown a three dimensional space 90. If it is assumed that possible data input values take on a range of values between zero and one and it is desired to find the value of $S(X,Y,Z)$ at the point $(X,Y,Z)$ 92, then $S_{<<<}(X,Y,Z)$ is the summation formed from all sample points in the cubic region W (91).

Now the region W (91) can be made up from a number of sub-regions or sub-volumes. In FIG. 8 to FIG. 15, there is shown a number of sub-regions V0–V7. These regions include:

V0 (FIG. 8) which is the rectangle bounded by the points (X-K, Y-K, Z-K) and (X,Y,Z)

V1 (FIG. 9) which is the rectangle bounded by the points (0,0,0) and (X-K, Y-K, Z-K).

V2 (FIG. 10) which is the rectangle bounded by the points (0,0,0) and (X-K, Y, Z).

V3 (FIG. 11) which is the rectangle bounded by the points (0,0,0) and (X, Y, Z-K).

V4 (FIG. 12) which is the rectangle bounded by the points (0,0,0) and (X, Y-K, Z).

V5 (FIG. 13) which is the rectangle bounded by the points (0,0,0) and (X-K, Y, Z-K).

V6 (FIG. 14) which is the rectangle bounded by the points (0,0,0) and (X, Y-K, Z-K).

V7 (FIG. 15) which is the rectangle bounded by the points (0,0,0) and (X-K, Y-K, Z).

Taking each of the volumes V0–V7, it can be seen that the volume W can be created utilising the following formula:

$$W = V0 + V2 + V3 + V4 - V5 - V6 - V7 + V1 \quad (EQ36)$$

Therefore, $S_{<<<}(X,Y,Z)$ can be created from a number of separate sums in accordance with Equation 36. These summation are as follows:

$S_{<<<}(X-K, Y-K, Z-K)$, which sums over V1.
$S_{<<<}(X-K, Y, Z)$, which sums over V2.
$S_{<<<}(X, Y, Z-K)$, which sums over V3.
$S_{<<<}(X, Y-K, Z)$, which sums over V4.
$S_{<<<}(X-K, Y, Z-K)$, which sums over V5.
$S_{<<<}(X, Y-K, Z-K)$, which sums over V6.
$S_{<<<}(X-K, Y, Z-K)$, which sums over V7.

This means that the sum for W (i.e. $S_{<<<}(X,Y,Z)$) can be calculated from the sums for V0–V7 (i.e. the other sums $S_{<<<}$ mentioned above). These sums must be multiplied by a constant to allow for the shift in the central point of the weighting function.

Hence the only actual summing of data required to calculate $S_{<<<}(X,Y,Z)$ is the sum over V0. The sum over the remaining volume is calculated from previous $S_{<<<}$ sums. V0 is one cube in the grid of points to be calculated.

Calculating all the $S_{<<<}$ sums involves summing over all such cubes. This is the same as making one pass through the data. Calculating the entire mapping will therefore involve eight passes through the data, one per octant.

Algorithmically, the process is as follows:

First create a three dimensional array $G_{j,l,m}$ of partial sums (this will contain the V0 sums), where $0<j<=N$, $0<l<=N$, $0<m<=N$, and $G_{j,l,m}$ is defined as:

$$G_{j,l,m} = \text{sum}_{(i: K.(j-1)<=xi<K.j, K.(l-1)<=yi<K.l, K.(m-1)<=zi<k.m)}(W_{K.j,K.l,K.m}(x_i,y_i,z_i)*v_i) \quad (EQ37)$$

The array $G_{j,i,m}$ can be formed by initializing the array to zeros and then making one pass through the data. Each data point takes part in exactly one of the sums in the array. So for each data point, the process is to calculate which sum it belongs to and add it to that sum. This can be represented algorithmically as follows:

$G_{j,i,m} = 0$ for all j,l,m
For all i
$j = \text{floor}(xi * N) + 1$
$l = \text{floor}(yi * N) + 1$
$m = \text{floor}(zi * N) + 1$
$G_{j,l,m} += w_{K.j,K.l,K.m}(x_i,y_i,z_i)*V_i$ In addition, we define $G_{j,l,m} = 0$ for $j = 0$ or $1 = 0$ or $m = 0$ (these are 'inclusive-OR's).

$S_{<<<}$ can then be calculated in the following way:
$S_{<<<}(X,Y,Z) = 0$ for $X=0$ or $Y=0$ or $Z=0$ (these are 'inclusive-OR's) by definition For $j = 1$ to For $l = 1$ to $N$ For $m = 1$ to $N$ $X = K \cdot j$ $Y = K \cdot l$ $Z = K \cdot m$ $$S_{<<<}(X, Y, Z) = G_{j, l, m} + e^{-K/\sigma} \cdot (S_{<<<}(X - K, Y, Z) +$$
$$S_{<<<}(X, Y - K, Z) + S_{<<<}(X, Y, Z - K)) - e^{-2K/\sigma} \cdot$$
$$(S_{<<<}(X - K, Y - K, Z) + S_{<<<}(X, Y - K, Z - K) +$$
$$S_{<<<}(X - K, Y, Z - K)) + e^{-3K/\sigma} \cdot S_{<<<}(X - K, Y - K, Z - K)$$

Of course, all the $S_{<<<}$ terms in the above formula will have already been calculated when they are required.

The other summations of Equation 27 to Equation 34 can then be calculated in a similar manner. Finally, Equation 35 can be utilised to produce a value of $S_{<<<}(X,Y,Z)$ for each desired output point.

Normally, the first method least-squares operation requires $O(N^3)$ passes through the data. Using the basic three dimensional incremental calculation method, this is reduced to $O(N^2)$ passes. Using the fully three-dimensional method, it is reduced to $O(1)$ passes at the cost of $O(N^3)$ storage spaces.

In practice, when generating a 16×16×16 mapping, execution time for the standard method was found to be approximately 30 minutes. The basic incremental method was found to take 4 minutes and the fully three-dimensional incremental method was found to take 15 seconds. The times being measured on an unloaded SUN SPARC station IPX.

Appendix A discloses the 'C' code implementation of the final fully three-dimensional incremental method described above.

The foregoing describes only a number of embodiments of the present invention and modifications, obvious to those skilled in the art, can be made thereto without departing from the scope of the present invention.

I claim:

1. In a computerized image processing system, a method for computing displayable output values of a first series of input points, given the output values of a second series of input points, said method being performed by computer and comprising, for each input point of said first series, the steps of:

forming a weighted distance measure, for each of said second series of input points, derived from the absolute distance between said first series input point and said second series input point;

determining an error measure function including a summation over each of said second series of input points, of an absolute error between a proposed line or curve and the output value of said second series of points, weighted by said weighted distance measure;

substantially minimizing said error measure function to produce a finalized line or curve; and, utilizing said finalized line or curve to derive an output value at said first series points.

2. A method as claimed in claim 1, wherein said weighted distance measure includes a negative exponential function of an absolute distance measure between said first series point and said second series point.

3. A method as claimed in claim 2, wherein said weighted distance measure is of the form:

$$e^{-d/\sigma}$$

where d is said absolute distance and σ is a constant scaling factor.

4. A method as claimed in claim 3, wherein ζ takes the value 0.06.

5. A method of calibrating a color printing device including the method set forth in claim 3.

6. A method as claimed in claim 2, wherein said weighted function is substantially of the form:

$$e^{-\frac{(|dx|+|dy|+|dz|)}{\sigma}}$$

where dx, dy and dz are distance measures between said second series input point and said first series input point.

7. A method of calibrating a color printing device including the method set forth in claim 6.

8. A method as claimed in claim 2, wherein ζ takes the value 0.06.

9. A method as claimed in claim 2, wherein said step of determining said error measure function comprises determining said summation from a previously calculated summation forming part of said error measure functions for adjacent input points of a current one of said first series of input points and from said second series of input points which are between said adjacent input points and said current one of said first series of input points.

10. A method of calibrating a color printing device including the method set forth in claim 2.

11. A method as claimed in claims 1, wherein σ takes the value 0.06.

12. A method of calibrating a color printing device including the method set forth in claim 11.

13. A method as claimed in claim 1, wherein said error measure function includes the square of the absolute error between said proposed line or curve and the output values of said second series of points.

14. A method of calibrating a color printing device including the method set forth in claim 13.

15. A method as claimed in claim 1, wherein both said series of points comprise three dimensional values.

16. A method as claimed in claim 15, wherein said three dimensional values are values in a Red, Green and Blue color space and said output value is from the group of Cyan, Magenta, Yellow or Black.

17. A method of calibrating a color printing device including the method set forth in claim 16.

18. A method of calibrating a color printing device including the method set forth in claim 15.

19. A method for color converting an input signal in a first color space to an output signal in a second color space including deriving a color table in accordance with the method set out in claim 1.

20. A method of calibrating a color printing device including the method set forth in claim 19.

21. A method as claimed in claim 1, wherein said step of determining said error measure function comprises determining said summation from a previously calculated summation forming part of said error measure functions for adjacent input points of a current one of said first series of input points and from said second series of input points which are between said adjacent input points and said current one of said first series of input points.

22. A method as claimed in claim 21, wherein said step of determining said error measure function further comprises multiplying said previously calculated summation by a constant.

23. A method of calibrating a color printing device including the method set forth in claim 21.

24. A method as claimed in claim 1, wherein said first series of input points comprise spaced input points and said second series of input points comprise sample points, said summation comprising a spaced input point summation, said method further comprising, for each of said spaced input points, forming a spaced input point summation comprising the steps of:

(A) calculating a series of final octant sums, comprising the steps of:

(1) utilising each spaced input point to perform the steps of:

(i) forming a first series of volumes having eight corners, each corner comprising an adjacent spaced input point;

(ii) forming a series of values, denoted gsum values, corresponding in number to said first series, each initially being zero;

(2) for each of the eight volume octants around a given sample point, determining a final octant summation comprising the steps of:
  (i) for each sample point, performing the steps of:
    (a) determining a corresponding volume of said series of volumes, for said sample point;
    (b) adding a weighted value times the output value of said sample point, to the corresponding gsum value, said weighting being with respect to a distance measure from a determined corner of said corresponding volume; said determination being made with respect to a current volume octant of said for each of the eight volume octants;
  (ii) for each equally spaced input point, performing the steps of:
    (a) in a predetermined order, forming a current one of said final octant sums from said gsum values and weighted final octant sums of previously calculated final octant sums;
  (B) forming said spaced input point summation from said partial sums of the current equally spaced input point.

25. A method as set claimed in claim 24, wherein said spaced input points are equally spaced in an input space.

26. A method as claimed in claim 25, wherein said summation requires 0(1) passes through the said second series of input points.

27. A method of calibrating a color printing device including the method set forth in claim 1.

* * * * *

UNITED STATES PATENT AND TRADEMARK OFFICE
CERTIFICATE OF CORRECTION

PATENT NO. : 5,880,738

DATED : March 9, 1999

INVENTOR(S) : ROSS ALEXANDER DONELLY

It is certified that error appears in the above-identified patent and that said Letters Patent is hereby corrected as shown below:

COLUMN 1

Line 32, "three dimensional" should read --three-dimensional--;
    Line 35, "printer 2," should read --printer 2--; and
    Line 58, "7 tuple" should read --7-tuple--.

COLUMN 2

Line 53, "-much" should read --much--.

COLUMN 3

Line 19, "utilizing" should read --¶ utilizing--; and
    Line 65, "the a one" should read --a one- --.

COLUMN 4

Line 1, "two dimensional" should read --two-dimensional--;
    Line 7, "value" should read --value,--;
    Line 16, "a is" should read --$\sigma$ is--; and
    Line 66, "four dimensional" should read --four-dimensional--.

COLUMN 5

Line 2, "xi" should read --$x_i$--;
    Line 56, "above mentioned" should read --above-mentioned--; and
    Line 65, "one dimensional" should read --one-dimensional--.

UNITED STATES PATENT AND TRADEMARK OFFICE
CERTIFICATE OF CORRECTION

PATENT NO. : 5,880,738

DATED : March 9, 1999

INVENTOR(S) : ROSS ALEXANDER DONELLY

It is certified that error appears in the above-identified patent and that said Letters Patent is hereby corrected as shown below:

<u>COLUMN 6</u>

Line 6, "one" should read --one- --;
    Line 18, "sumi" should read --$sum_i$--;
    Line 52, "sumi($w_x$" should read --$sum_i(w_X$--;
    Line 57, "($w_x$" should read --($w_X$--; and
    Line 59, "tm" should be deleted.

<u>COLUMN 8</u>

Line 5, "three dimensional" should read --three-dimensional--;
    Line 8, "one" should read --one- --;
    Line 18, "three dimensional" should read --three-dimensional--;
    Line 20, "three dimensional" should read --three-dimensional--;
    Line 27, "($w_{x,y,z}$" should read --($w_{X,Y,Z}$--;
    Line 31, "$sum_{i:xi<x}(W_{x,y,z}$" should read --$sum_{i:xi<x}(w_{X,Y,Z}$--;
    Line 33, "Sum" should read --sum--; and
    Line 45, "(O,Y,Z)" should read --(0,Y,Z)--.

UNITED STATES PATENT AND TRADEMARK OFFICE
CERTIFICATE OF CORRECTION

PATENT NO. : 5,880,738

DATED : March 9, 1999

INVENTOR(S) : ROSS ALEXANDER DONELLY

It is certified that error appears in the above-identified patent and that said Letters Patent is hereby corrected as shown below:

COLUMN 9

Line 1, "one dimensional" should read --one-dimensional--;
    Line 6, "three dimensional" should read --three-dimensional--;
    Line 9, "three dimensional" should read --three-dimensional--;
    Line 11, "three" should read --three- --;
    Line 17, "$(W_{x,y,z}$" should read --$(w_{x,y,z}$--;
    Line 19, "$,X,Y,Z)$" should read --$(X,Y,Z)$--;
    Line 20, "$S_{<<<}$" should read --$S_{<><}$--;
    Line 23, "$(W_{X,Y,Z}$" should read --$(w_{X,Y,Z}$--;
    Line 28, "$(W_{X,Y,Z}$" should read --$(w_{X,Y,Z}$--;
    Line 31, "$S_{<<>}$" should read --$S_{<>>}$--;
    Line 34, "three dimensional" should read --three-dimensional--; and
    Line 67, "mation" should read --mations--.

COLUMN 10

Line 22, "three dimensional" should read --three-dimensional--;
    Line 36, "(xi" should read --$(x_i$--;
    Line 37, "(yi" should read --$(y_i$--;
    Line 38, "(zi" should read --$(z_i$--;
    Line 40, "$V_i$" should read --$v_i$--; and
    Line 47, "1 to" should read --1 to N--.

COLUMN 11

Line 4, "three" should read --three- --;
    Line 38, "and," should read --and--; and
    Line 58, "+dz|)" should read --+|dz|)--.

UNITED STATES PATENT AND TRADEMARK OFFICE
CERTIFICATE OF CORRECTION

PATENT NO. : 5,880,738

DATED : March 9, 1999

INVENTOR(S) : ROSS ALEXANDER DONELLY

It is certified that error appears in the above-identified patent and that said Letters Patent is hereby corrected as shown below:

<u>COLUMN 12</u>

Line 11, "claims 1," should read --claim 1,--;
    Line 22, "three dimensional" should read --three-dimensional--;
    Line 23, "three" should read --three- --.

<u>COLUMN 14</u>

Line 7, "set" should be deleted.

Signed and Sealed this

Fourteenth Day of December, 1999

Attest:

*Attesting Officer*

Q. TODD DICKINSON

*Acting Commissioner of Patents and Trademarks*